UNITED STATES PATENT OFFICE.

PETER B. LAIRD, OF WEST DANVILLE, VERMONT.

IMPROVED COMPOSITION FOR WELDING AND REFINING STEEL.

Specification forming part of Letters Patent No. 53,010, dated March 6, 1866.

*To all whom it may concern:*

Be it known that I, PETER B. LAIRD, of West Danville, of the county of Caledonia, of the State of Vermont, have invented a new and useful Composition to be Used as a Substitute for Borax in the Welding of Iron and Steel or for Refining Steel; and I do hereby declare the same to be fully described as follows.

The composition in question may be made of the following ingredients and in the proportions hereinafter set forth, although I do not confine the invention to such proportions, as they may be varied somewhat without materially affecting the character or nature of the compound.

In making the said composition, I use two ounces of protosulphate of iron, one-half an ounce of hydrochlorate of ammonia, four ounces of muriate of soda, eight pounds of silex or sand. To the above may be added, if desirable, as it much improves the composition, two ounces of common glass.

The said articles, after each has been pulverized or reduced to a fine powder, are to be thoroughly mixed together, after which the mixture will be ready for use.

It is to be used as borax is ordinarily employed in the process of welding. It may also be used to good advantage in refining steel. To this end steel which has deteriorated by use may be heated to a welding heat and subsequently be dipped into the composition, so as to be covered by it. Next, it should be again heated to a welding heat, and after it may have become cool it will be found to be in a refined state.

The composition costs about one-hundredth part of that of the borax necessary to perform the same result. Furthermore, the composition improves the steel, and does not injure it as borax does.

I do not pretend to explain the chemical action of each ingredient of the composition when under the influence of heat in the welding process. I have found by practice and experience that all the ingredients of the composition, when combined or mixed together, produce a better result than will any one, two, or three of them without the rest.

I have found another great advantage to result from the employment of the composition, inasmuch as with it it is next to an impossibility to burn or destroy the metal, as often takes place when borax is used.

I claim—

The welding composition as made of the ingredients and in the manner substantially as described.

PETER B. LAIRD.

Witnesses:
R. H. EDDY,
F. P. HALE, Jr.